United States Patent
Yokoyama et al.

(10) Patent No.: US 10,947,909 B2
(45) Date of Patent: Mar. 16, 2021

(54) CONTROL DEVICE OF INTERNAL COMBUSTION ENGINE AND CONTROL METHOD OF SAME AND LEARNING MODEL FOR CONTROLLING INTERNAL COMBUSTION ENGINE AND LEARNING METHOD OF SAME

(71) Applicant: TOYOTA JIDOSHA KABUSHIKI KAISHA, Toyota (JP)

(72) Inventors: Daiki Yokoyama, Gotemba (JP); Eiki Kitagawa, Odawara (JP); Tomihisa Oda, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/566,019

(22) Filed: Sep. 10, 2019

(65) Prior Publication Data

US 2020/0123990 A1 Apr. 23, 2020

(30) Foreign Application Priority Data

Oct. 17, 2018 (JP) .............................. JP2018-196035

(51) Int. Cl.
*F02D 28/00* (2006.01)
(52) U.S. Cl.
CPC ................... *F02D 28/00* (2013.01)
(58) Field of Classification Search
CPC ............ F02D 28/00; F02D 2200/1004; F02D 41/1452; F02D 41/1461; F02D 41/2477; F02D 41/2451; F02D 41/1405; G05B 13/027

See application file for complete search history.

(56) References Cited

U.S. PATENT DOCUMENTS

| 2006/0219197 A1* | 10/2006 | Machida | F02D 13/023 123/90.16 |
| 2010/0168989 A1* | 7/2010 | Gao | F02D 41/2477 701/110 |
| 2011/0264353 A1* | 10/2011 | Atkinson | F02D 41/1405 701/102 |
| 2015/0217449 A1* | 8/2015 | Meier | B25J 9/1602 700/257 |

(Continued)

FOREIGN PATENT DOCUMENTS

JP 2012-112277 A 6/2012

*Primary Examiner* — Joseph J Dallo
(74) *Attorney, Agent, or Firm* — Oliff PLC (57) ABSTRACT

A control device of an internal combustion engine is configured to output a predicted value of an output parameter by using a learning model if actually measured values of input parameters are input, control the internal combustion engine based on the predicted value of the output parameter, learn the learning model by using a gradient method and by using a combination of actually measured values of the input parameters and an actually measured value of the output parameter as teacher data, and adjust the learning rate so that the learning is performed by a smaller learning rate when an amount of noise superposed on an actually measured value of at least one parameter among the input parameters and the output parameter is relatively large compared with when the amount of noise superposed on the actually measured value of the parameter is relatively small.

9 Claims, 8 Drawing Sheets (56) References Cited

U.S. PATENT DOCUMENTS

| | | | |
|---|---|---|---|
| 2016/0025028 A1* | 1/2016 | Vaughan | F02D 41/1405 |
| | | | 701/105 |
| 2019/0095785 A1* | 3/2019 | Sarkar | G06N 20/00 |
| 2020/0030970 A1* | 1/2020 | Mariyama | B25J 9/161 |
| 2020/0241483 A1* | 7/2020 | Liang | G05B 13/027 |

* cited by examiner

CONTROL DEVICE OF INTERNAL COMBUSTION ENGINE AND CONTROL METHOD OF SAME AND LEARNING MODEL FOR CONTROLLING INTERNAL COMBUSTION ENGINE AND LEARNING METHOD OF SAME

FIELD

The present disclosure relates to a control device of an internal combustion engine and a control method of the same and to a learning model for controlling the internal combustion engine and a learning method of the same.

BACKGROUND

Known in the past has been the art of controlling an internal combustion engine of a vehicle by using a learning model learned by machine learning (for example, see PTL 1). In particular, in the models described in PTL 1, if a plurality of input parameters relating to operation of the internal combustion engine are input, a neural network is used to output flow rates of intake gas, exhaust gas, and EGR gas. In this machine learning, it is important to prepare a learning model so that an error between a predicted value of an output parameter output by the learning model and an actual value of the output parameter becomes smaller.

CITATION LIST

Patent Literature

[PTL 1] Japanese Patent Publication No. 2012-112277

SUMMARY

Technical Problem

In this regard, in a control device of an internal combustion engine using a learning model, learning of the learning model is presumed to be performed based on teacher data inherent to the vehicle acquired during operation. Due to this, features inherent to the vehicle are reflected in the learning model after learning. For this reason, it becomes possible to reduce the error between a predicted value of an output parameter output from the learning model and the actual value of that output parameter (below, referred to as "prediction error"). According to such a learning model, it becomes possible to more suitably control the internal combustion engine.

However, noise is superposed on teacher data acquired during operation due to, for example, the driving environment, driving conditions, or other various factors. As the amount of noise superposed on the teacher data becomes larger, the noise is easily reflected in the learning results at the time of learning of the learning model. As a result, the convergence of the learning deteriorates and the prediction error in the learning model is liable to increase.

The present disclosure was made in consideration of the above technical problem and has as its object the provision of a control device of an internal combustion engine able to suppress the effect of noise on learning of a learning model even if noise is superposed on teacher data and a control method of the same and of a learning model for controlling the internal combustion engine and a learning method of the same.

Solution to Problem

The summary of the present disclosure is as follow.

(1) A control device of an internal combustion engine for controlling an operation of an internal combustion engine of a vehicle, the control device of an internal combustion engine comprising: a parameter output part outputting a predicted value of an output parameter by using a learning model if actually measured values of input parameters are input, an engine control part controlling the internal combustion engine based on the predicted value of the output parameter output from the parameter output part, a learning part learning the learning model by using a gradient method and by using a combination of actually measured values of the input parameters of the learning model and an actually measured value of the output parameter of the learning model as teacher data, and a learning rate adjusting part adjusting the learning rate so that the learning is performed by a smaller learning rate when an amount of noise superposed on an actually measured value of at least one parameter among the input parameters and the output parameter is relatively large compared with when the amount of noise superposed on the actually measured value of the parameter is relatively small.

(2) The control device of an internal combustion engine according to claim 1, further comprising a noise detecting part detecting the amounts of noise superposed on the actually measured values of the input parameters and the actually measured value of the output parameter, the noise detecting part calculating a standard deviation or a reciprocal of an SN ratio of each parameter based on the actually measured values of the input parameters and output parameter detected when the engine operating state is a steady state and using the standard deviation or the reciprocal of the SN ratio of each parameter as the amount of noise of the parameter.

(3) The control device of an internal combustion engine according to claim 1 or 2, wherein the learning rate adjusting part adjusts the learning rate so that the learning rate becomes smaller the larger the amount of noise superposed on the actually measured value of at least one parameter.

(4) The control device of an internal combustion engine according to any one of claims 1 to 3, wherein when the amounts of noise superposed on the actually measured values of the input parameters and the output parameter are equal to or less than threshold values set for the parameters, the learning rate adjusting part adjusts the learning rate so as to be maintained at a constant learning rate larger than the learning rate when the amount of noise superposed on the actually measured value of at least one parameter is larger than the threshold value.

(5) The control device of an internal combustion engine according to any one of claims 1 to 4, wherein the control device of an internal combustion engine is an electronic control unit provided at the vehicle.

(6) The control device of an internal combustion engine according to any one of claims 1 to 4, wherein the control device of an internal combustion engine comprises an electronic control unit provided at the vehicle and a server installed at an outside of the vehicle and configured to be able to communicate with the electronic control unit, the electronic control unit comprises the parameter output part and the engine control part, the server comprises the learning part and the learning rate adjusting part, the electronic control unit sends the teacher data to the server, the learning rate adjusting part adjusts the learning rate based on the amount of noise superposed on the actually measured values of the input parameters and the actually measured value of the output parameter included in the teacher data, the learning part learns the learning model by using the teacher data received from the electronic control unit and sends the learning model after learning to the electronic control unit, and the parameter output part uses the learning model after learning sent from the learning part to the electronic control unit.

(7) A control method of an internal combustion engine using a learning model to control an operation of the internal combustion engine of a vehicle, the control method of an internal combustion engine cause a processor to perform steps of: adjusting the learning rate so as to become smaller when the amount of noise superposed on the actually measured value of at least one parameter among the input parameters of the learning model and the output parameter of the learning model is relatively large compared with when the amount of noise superposed on the actually measured value of the parameter is relatively small, learning of the learning model by a gradient method by using the adjusted learning rate and by using a combination of the actually measured values of the input parameters and the actually measured value of the output parameter as teacher data, outputting a predicted value of the output parameter by using the learning model if the actually measured values of the input parameters are input, and controlling the internal combustion engine based on the output predicted value of the output parameter.

(8) A learning model for controlling an internal combustion engine, the leaning model causes a processor to function so as to output a predicted value of an output parameter used for control of an internal combustion engine if actually measured values of input parameters are input, wherein the learning model is learned by a gradient method using a combination of actually measured values of the input parameters and an actually measured value of the output parameter as teacher data, and, in the learning, a learning rate adjusted to become a smaller learning rate is used when the amount of noise superposed on the actually measured value of at least one parameter among the input parameters and the output parameter is relatively large compared with when the amount of noise superposed on the actually measured value of that parameter is relatively small.

(9) A learning method of a learning model for controlling an internal combustion engine, the learning method causes a processor to function so as to output a predicted value of an output parameter used for control of an internal combustion engine if actually measured values of input parameters are input, wherein the learning model is learned by a gradient method using a combination of actually measured values of the input parameters and an actually measured value of the output parameter as teacher data, and, in the learning, a learning rate adjusted to become a smaller learning rate is used when the amount of noise superposed on the actually measured value of at least one parameter among the input parameters and the output parameter is relatively large compared with when the amount of noise superposed on the actually measured value of that parameter is relatively small.

Advantageous Effects of Invention

According to the present disclosure, it is possible to suppress the effect of noise on learning of a learning model even if noise is superposed on teacher data.

DESCRIPTION OF EMBODIMENTS

Below, referring to the drawings, embodiments of the present invention will be explained in detail. Note that, in the following explanation, similar component elements are assigned the same reference notations.

First Embodiment

Configuration of Internal Combustion Engine

Figure 1:
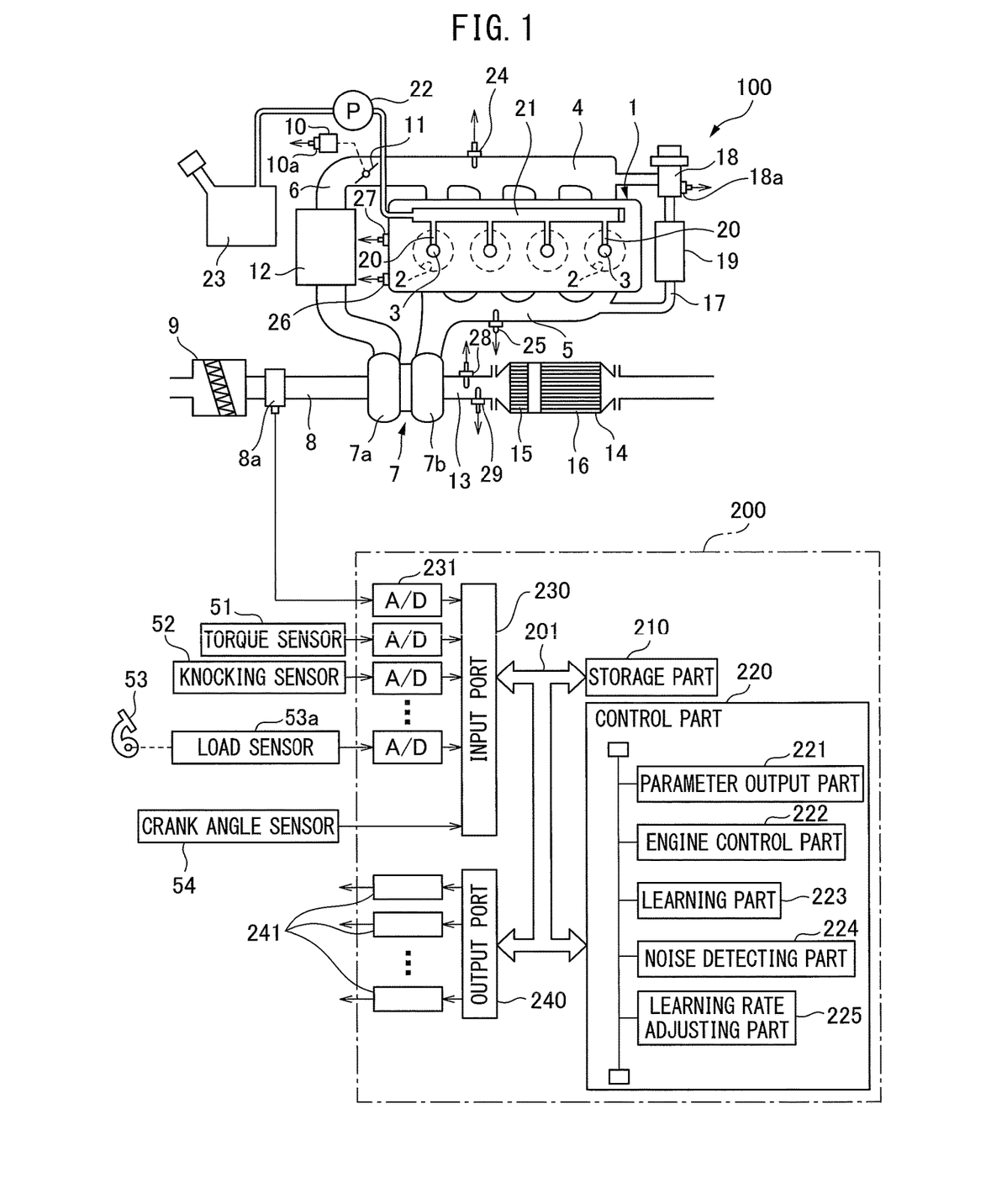
FIG. 1 is a schematic view of the configuration of an internal combustion engine and an electronic control unit controlling the internal combustion engine according to a first embodiment of the present disclosure.

FIG. 1 is a schematic view of the configuration of an internal combustion engine and an electronic control unit (ECU) controlling the internal combustion engine according to a first embodiment. FIG. 1 shows an internal combustion engine 100 including an engine body 1, intake manifold 4, and exhaust manifold 5. As shown in FIG. 1, the engine body 1 includes fuel injectors 3 for feeding fuel into the combustion chambers 2 of the cylinders. The intake manifold 4 is connected through an intake duct 6 to an outlet of a compressor 7a of an exhaust turbocharger 7. The inlet of the compressor 7a is connected to an air cleaner 9. A throttle valve 11 driven to operate by a throttle actuator 10 is placed in the intake duct 6. Around the intake duct 6, an intercooler 12 for cooling the intake air flowing through the inside of the intake duct 6 is placed.

On the other hand, the exhaust manifold 5 is connected to an inlet of an exhaust turbine 7b of the exhaust turbocharger 7, while the outlet of the exhaust turbine 7b is connected through an exhaust pipe 13 to an exhaust purification use catalytic converter 14. In the example shown in FIG. 1, in this exhaust purification use catalytic converter 14, an oxidation catalyst 15 and particulate filter 16 are arranged in that order from the upstream side. The exhaust manifold 5 and the intake manifold 4 are connected with each other through an exhaust gas recirculation (below, referred to as "EGR") passage 17. An EGR control valve 18 is placed in the EGR passage 17. Further, an EGR cooler 19 for cooling the EGR gas flowing through the inside of the EGR passage 17 is placed in the EGR passage 17. The fuel injectors 3 are connected through a fuel feed pipe 20 to a common rail 21. This common rail 21 is connected through a fuel pump 22 to a fuel tank 23.

As shown in FIG. 1, an intake temperature sensor 24 for detecting an intake temperature at the inside of the intake manifold 4 is placed in the intake manifold 4. An exhaust temperature sensor 25 for detecting an exhaust temperature at the inside of the exhaust manifold 5 is placed in the exhaust manifold 5. An air flow meter 8a for detecting the flow rate of air flowing through the inside of the intake pipe 8 is placed in the intake pipe 8. Further, a water temperature sensor 26 for detecting a temperature of engine cooling water (below, simply referred to as the "water temperature") and an oil temperature sensor 27 for detecting a temperature of lubrication oil lubricating friction sliding parts of the engine body 1 (below, simply referred to as the "oil temperature") are placed in the engine body 1.

A throttle opening degree sensor 10a for detecting an opening degree of the throttle valve 11 (below, referred to as the "throttle opening degree") is placed in the throttle actuator 10. An EGR valve opening degree sensor 18a for detecting the opening degree of the EGR control valve 18 (below, referred to as the "EGR valve opening degree") is placed in the EGR control valve 18.

A gas concentration sensor 28 for detecting a concentration of gas in the exhaust gas and an air-fuel ratio sensor 29 for detecting an air-fuel ratio of the exhaust gas are placed in the exhaust pipe 13, respectively. The gas concentration sensor 28 can, for example, be a $NO_x$ sensor detecting a concentration of $NO_x$ in the exhaust gas. As the gas concentration sensor 28, in addition to the $NO_x$ sensor, for example, an HC sensor, CO sensor, or $CO_2$ sensor respectively detecting the concentration of HC, the concentration of CO, and the concentration of $CO_2$ in the exhaust gas or other sensors can be suitably used in accordance with the learning model and the later explained parameters used in the learning model.

Configuration of ECU

The electronic control unit (ECU) 200 includes components connected with each other by a bidirectional bus 201 such as a storage part 210, control part 220, input port 230, and output port 240.

The storage part 210 can, for example, include a ROM (read only memory), RAM (random access memory), etc. The storage part 210 stores various types of programs and learning models and various types of data (for example, various types of parameters, teacher data, various types of threshold values, etc.) used in processing by the control part 220.

The control part 220 can, for example, be a processor having a CPU and its peripheral circuits etc. The control part 220 can perform various types of programs stored in the storage part 210 to thereby perform various types of control of the vehicle.

As shown in FIG. 1, the control part 220 includes a plurality of functional modules loaded by programs run on the processor of the control part 220. Specifically, the control part 220 includes, as functional modules, a parameter output part 221, engine control part 222, learning part 223, noise detecting part 224, and learning rate adjusting part 225.

Output signals of the air flow meter 8a, throttle opening degree sensor 10a, EGR valve opening degree sensor 18a, intake temperature sensor 24, exhaust temperature sensor 25, water temperature sensor 26, oil temperature sensor 27, gas concentration sensor 28, air-fuel ratio sensor 29, torque sensor 51 detecting the output torque of the internal combustion engine 100 (below, referred to as the "torque"), knocking sensor 52 detecting the presence of any knocking, etc. are input to the input port 230 through corresponding AD converters 231. Further, as the signal for detecting the engine load, an output voltage of the load sensor 53a generating an output voltage proportional to the amount of depression of the accelerator pedal 53 is input to the input port 230 through a corresponding AD converter 231. Further, as the signal for calculating the engine speed etc., an output signal of a crank angle sensor 54 generating an output pulse each time the crankshaft rotates by for example 15° is input to the input port 230. In this way, output signals of various types of sensors required for controlling the internal combustion engine 100 are input to the input port 230.

The output port 240 is electrically connected through corresponding drive circuits 241 to the fuel injectors 3, throttle actuator 10, EGR control valve 18, fuel pump 22, and other controlled parts.

The ECU 200 outputs control signals for controlling the controlled parts based on the output signals of the various types of sensors input to the input port 230 from the output port 240 to control the internal combustion engine 100. Therefore, in the present embodiment, the ECU 200 functions as the control device of the internal combustion engine 100.

Summary of Neural Network

Figure 2:
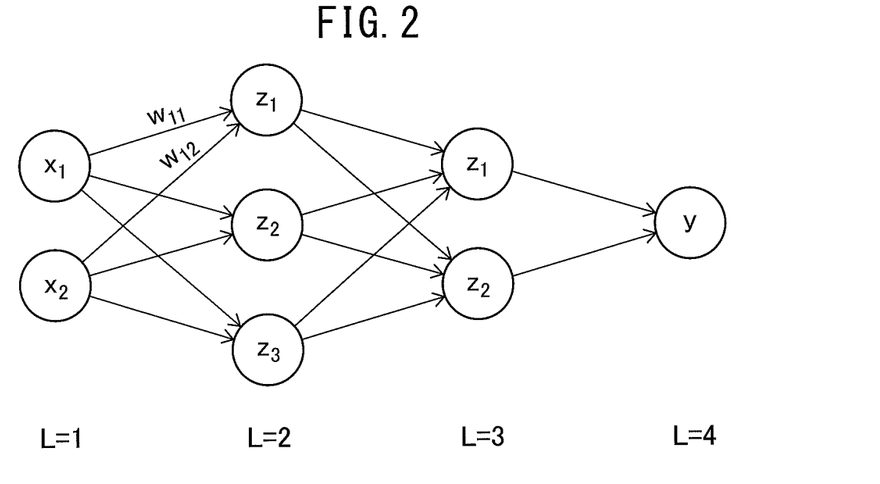
FIG. 2 is a view showing one example of a neural network.

In the embodiments of the present invention, the learning model uses a neural network. First, referring to FIG. 2, the neural network used in the learning model according to the present embodiment will be explained. FIG. 2 shows one example of a neural network. The circle marks in FIG. 2 show artificial neurons. In the neural network, these artificial neurons are usually called "nodes" or "units" (below, called "nodes"). In FIG. 2, L=1 shows an input layer, L=2 and L=3 show hidden layers, and L=4 shows an output layer. Further, in FIG. 2, $x_1$ and $x_2$ show nodes of the input layer (L=1) and output values from the nodes and "y" shows the node of the output layer (L=4) and an output value from the node. Similarly, $z_1$, $z_2$, and $z_3$ of the hidden layer (L=2) show output values from the nodes of the hidden layer (L=2), and $z_1$, and $z_2$ of the hidden layer (L=3) show output values from the nodes of the hidden layer (L=3). Note that, the number of hidden layers may be made one or any other number, while the number of nodes of the input layer and number of nodes of the hidden layers may also be made any numbers. Note that, in the present embodiment, the number of nodes of the output layer may be made one node.

At the nodes of the input layer, the inputs are output as they are. On the other hand, the output values $x_1$ and $x_2$ of the nodes of the input layer are input to the nodes of the hidden layer (L=2). At the nodes of the hidden layer (L=2), the respectively corresponding weights "w" and biases "b" are used to calculate the sum input values "u". For example, a sum input value $u_k$ calculated at a node shown by $z_k$ (k=1, 2, 3) of the hidden layer (L=2) in FIG. 2 becomes as shown in the following equation (M is the number of nodes of the input layer):

$$u_k = \sum_{m=1}^{M} (x_m \cdot w_{km}) + b_k \qquad \text{[Equation 1]}$$

Next, this sum input value $u_k$ is converted by an activation function "f" and is output from a node shown by $z_k$ of the hidden layer (L=2) as an output value $z_k$ (=$f(u_k)$). On the other hand, the output values $z_1$, $z_2$, and $z_3$ of the nodes of the hidden layer (L=2) is input to the nodes of the hidden layer (L=3). At the nodes of the hidden layer (L=3), the respectively corresponding weights "w" and biases "b" are used to calculate the sum input values "u" (Σz·w+b). The sum input values "u" are similarly converted by an activation function "f" and output from the nodes of the hidden layer (L=3) as the output values $z_1$ and $z_2$. Note that, in the embodiments according to the present invention, as this activation function, a Sigmoid function σ is used.

On the other hand, the output values $z_1$ and $z_2$ of the nodes of the hidden layer (L=3) are input to the node of the output layer (L=4). At the node of the output layer, the respectively corresponding weights "w" and biases "b" are used to calculate the sum input value "u" (Σz·w+b) or just the respectively corresponding weights "w" are used to calculate the sum input value "u" (Σz·w). In the present embodiment, at the node of the output layer, an identity function is used as the activation function, therefore, from the node of the output layer, the sum input value "u" calculated at the node of the output layer is output as it is as the output value "y".

Learning at Neural Network

In the present embodiment, the gradient method, in particular the gradient descent method, is used to learn the weights and biases in the neural network of the learning model. This gradient descent method is known. Therefore, the gradient descent method will be simply explained below in outline. Note that, a bias "b" is one kind of weight "w". Therefore, in the following explanation, a bias "b" is deemed one type of weight "w". Further, the weights and biases are learned at the learning part 223.

In the gradient descent method, the values of the weights "w" of the neural network are learned so as to decrease the value of E(w) using the gradient ∂E(w)/∂w for the error function E(w). Specifically, in the gradient descent method, the weights $w_{(T)}$ after the T-th (T is any whole number of 1 or more) updating are calculated by the following equation (1). The weights are learned by repeating such updating:

$$w_{(T)} = w_{(T-1)} - \eta(\partial E(w_{(T-1)})) \quad (1)$$

The η in equation (1) is the learning rate and is for adjusting the amount of updating of the weights "w" in the learning. The learning rate η is a hyper parameter never repeatedly updated along with learning. As will be understood from equation (1), the amount of updating of weights from $w_{(T-1)}$ to $w_{(T)}$ is proportional to the absolute value of the gradient of $E(w_{(T-1)})$ and the learning rate η. If the learning rate is small, that is, if the amount of updating of the weights "w" per one update is small, the learning easily converges, but the number of times of updating the weights required until the learning converges becomes greater, and therefore time ends up being taken for learning. On the other hand, if the learning rate is too large, learning becomes less likely to converge. Still further, the learning is liable to end up diverging. If it were possible to suitably set the learning rate fewer times of updating of the weights "w", that is, a shorter time of learning, can be used to find the values of the weights "w" when E(w) takes the smallest value.

Figure 3:
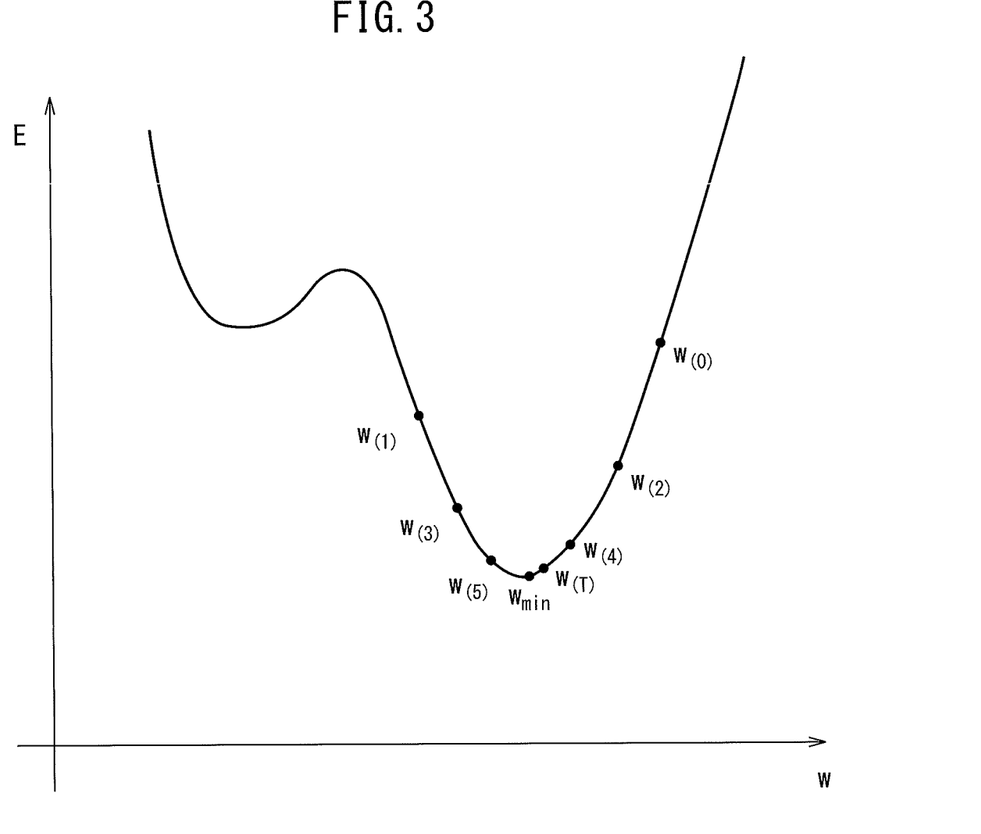
FIG. 3 is a view showing one example of the relationship between any one weight and an error function E(w).

FIG. 3 will be used to explain the gradient descent method. FIG. 3 is a view showing one example of the relationship between any one weight and the error function E(w). Note that, in FIG. 3, the specific relationship of the weight and E(w) is shown for convenience, but in actual learning, such a specific relationship is unknown. However, during learning, the value of E(w) at the current weight "w" is obtained. In addition, the later explained error backpropagation algorithm etc. is used to obtain the gradient ∂E(w)/∂w. In the gradient descent method, information of the gradient ∂E(w)/∂w is used to find the weight "w" when E(w) takes the smallest value.

FIG. 3 shows the state of change of the weight "w" when repeatedly updating the weight "w" by learning. In the example shown in FIG. 3, the initial value of weight becomes $w_{(0)}$. Further, as shown in FIG. 3, at the first updating, the direction of the gradient $\partial E(w_{(0)})/\partial w_{(0)}$ is a positive direction, and therefore the weight is updated based on equation (1) in the negative direction from $w_{(0)}$ to $w_{(1)}$. As shown in FIG. 3, at the second updating, the direction of the gradient $\partial E(w_{(1)})/\partial w_{(1)}$ is a negative direction, and therefore the weight is updated based on equation (1) in the positive direction from $w_{(1)}$ to $w_{(2)}$. After that, based on equation (1), such a weight is repeatedly updated from $w_{(2)}$ to $w_{(3)}$, $w_{(3)}$ to $w_{(4)}$, and $w_{(4)}$ to $w_{(5)}$. In the example shown in FIG. 3, each time updating is repeated, the absolute value of the gradient of E(w) becomes smaller, and therefore the amount of updating of the weight "w" becomes smaller. As a result, the weight "w" converges toward the weight $w_{min}$ when E(w) takes its smallest value. If the weight $w_{(T)}$ is updated the T-th time (T is any preset number of times), the learning is ended. Due to such learning, the weight "w" is updated so that E(w) becomes smaller. As a result, it is possible to reduce the prediction error in the learning model.

Next, the method of calculation of the gradient ∂E(w)/∂w used in equation (1) will be explained. In the present embodiment, the gradient ∂E(w)/∂w is calculated using the error backpropagation algorithm. This error backpropagation algorithm is also known. Therefore, the error backpropagation algorithm will be simply explained in outline below:

Now then, in the neural network such as shown in FIG. 2, if the weights at the input values $u^{(L)}$ to the nodes of the layers of L=2, L=3, or L=4 are expressed by $w^{(L)}$, the partial differential due to the weights $w^{(L)}$ of the error function E, that is, the gradient $\partial E/\partial w^{(L)}$, is shown by the following equation (2):

[Equation 2]

$$\partial E/\partial w^{(L)} = (\partial E/\partial u^{(L)})(\partial u^{(L)}/\partial w^{(L)}) \quad (2)$$

where, $z^{(L-1)} \cdot \partial w^{(L)} = \partial u^{(L)}$, and therefore if $(\partial E/\partial u^{(L)}) = \delta^{(L)}$, the above equation (2) can be shown by the following equation (3):

[Equation 3]

$$\partial E/\partial w^{(L)} = \delta^{(L)} \cdot z^{(L-1)} \quad (3)$$

Here, if $u^{(L)}$ fluctuates, fluctuation of the error function E is caused through the change in the sum input values $u^{(L+1)}$ of the following layer, and therefore $\delta^{(L)}$ can be expressed by the following equation (4) (K is the number of nodes at the L+1 layer):

[Equation 4]

$$\delta^{(L)} = (\partial E/\partial u^{(L)}) = \sum_{k=1}^{K} (\partial E/\partial u_k^{(L+1)})(\partial u_k^{(L+1)}/\partial u^{(L)}) \quad (4)$$

$$(k = 1, 2, \ldots, K)$$

where, if $z^{(L)} = f(u^{(L)})$, the input value $u_k^{(L+1)}$ appearing at the right side of the above equation (4) can be expressed by the following equation (5):

[Equation 5]

$$\text{Input value } u_k^{(L+1)} = \sum_{k=1}^{k} w_k^{(L+1)} \cdot z^{(L)} = \sum_{k=1}^{k} w_k^{(L+1)} \cdot f(u^{(L)}) \quad (5)$$

where, the first term ($\partial E/\partial u^{(L+1)}$) at the right side of the above equation (4) is $\delta^{(L+1)}$. The second term ($\partial u_k^{(L+1)}/\partial u_u^{(L)}$) at the right side of the above equation (4) can be expressed by the following equation (6) from the above equation (5):

[Equation 6]

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (6)$$

Therefore, $\delta^{(L)}$ can be expressed by the following equation (7) from the above equations (4) to (6):

[Equation 7]

$$\delta^{(L)} = \sum_{k=1}^{k} w_k^{(L+1)} \cdot \delta^{(L+1)} \cdot f'(u^{(L)}) \quad (7)$$

$$\text{That is, } \delta^{(L-1)} = \sum_{k=1}^{k} w_k^{(L)} \cdot \delta^{(L)} \cdot f'(u^{(L-1)})$$

That is, if $\delta^{(L+1)}$ is found, it is possible to find $\delta^{(L)}$.

Now then, teacher data including certain input values "x" and true data "t" for the input values "x" is found. When the output value from the output layer corresponding to the input values "x" is "y", if the square error is used as the error function, the square error E is found by $E=(y-t)^2/2$. At the node of the output layer (L=4) shown in FIG. 2, the output value "y" becomes $f(u^{(L)})$, therefore, in this case, the value of $\delta^{(L)}$ at the node of the output layer (L=4) becomes like in the following equation (8):

[Equation 8]

$$\delta^{(L)} = \partial E/\partial u^{(L)} = (\partial E/\partial y)(\partial y/\partial u^{(L)}) = (y-t) \cdot f'(y^{(L)}) \quad (8)$$

In this regard, in the present embodiment, as explained above, $f(u^{(L)})$ is an identity function and $f(u^{(L)})=1$. Therefore, $\delta^{(L)}=y-t$ and $\delta^{(L)}$ can be found.

If $\delta^{(L)}$ is found, the above equation (7) can be used to find the $\delta^{(L-1)}$ of the previous layer. The $\delta$'s of the previous layer are successively found in this way. Using these values of $\delta$'s, from the above equation (3), the partial differential of the error function E, that is, the gradient $\partial E/\partial w^{(L)}1$ can be found for the weights "w".

Summary of Learning Model

A summary of the learning model in the present embodiment will be explained. First, one example of the input parameters used in the learning model according to the present embodiment will be explained. The input parameters of the learning model according to the present embodiment can include two or more of the ignition timing, fuel injection amount, fuel injection timing, operating timing of intake valves and operating timing of exhaust valves of the internal combustion engine, throttle opening degree, EGR valve opening degree, intake temperature, water temperature, oil temperature, and engine speed.

Next, one example of the method of acquisition of the actually measured values of the input parameters will be explained. The ignition timing, fuel injection amount, fuel injection timing, and operating timing of intake valves and operating timing of exhaust valves of the internal combustion engine are respectively acquired from command values of the ECU 200. The throttle opening degree, EGR valve opening degree, water temperature, intake temperature, and oil temperature are respectively acquired from the output values of the throttle opening degree sensor 10*a*, EGR valve opening degree sensor 18*a*, intake temperature sensor 24, water temperature sensor 26, and oil temperature sensor 27. The engine speed is acquired from the calculated value of the ECU 200 based on the output signal of the crank angle sensor 54.

Next, one example of the output parameters used in the learning model in the present embodiment will be explained. The output parameters of the learning model in the present embodiment can include at least one of the exhaust temperature, $NO_x$ concentration, HC concentration, CO concentration, and $CO_2$ concentration in the exhaust gas, air-fuel ratio of the exhaust gas, and output torque and knocking determination value of the internal combustion engine 100.

Figure 4:
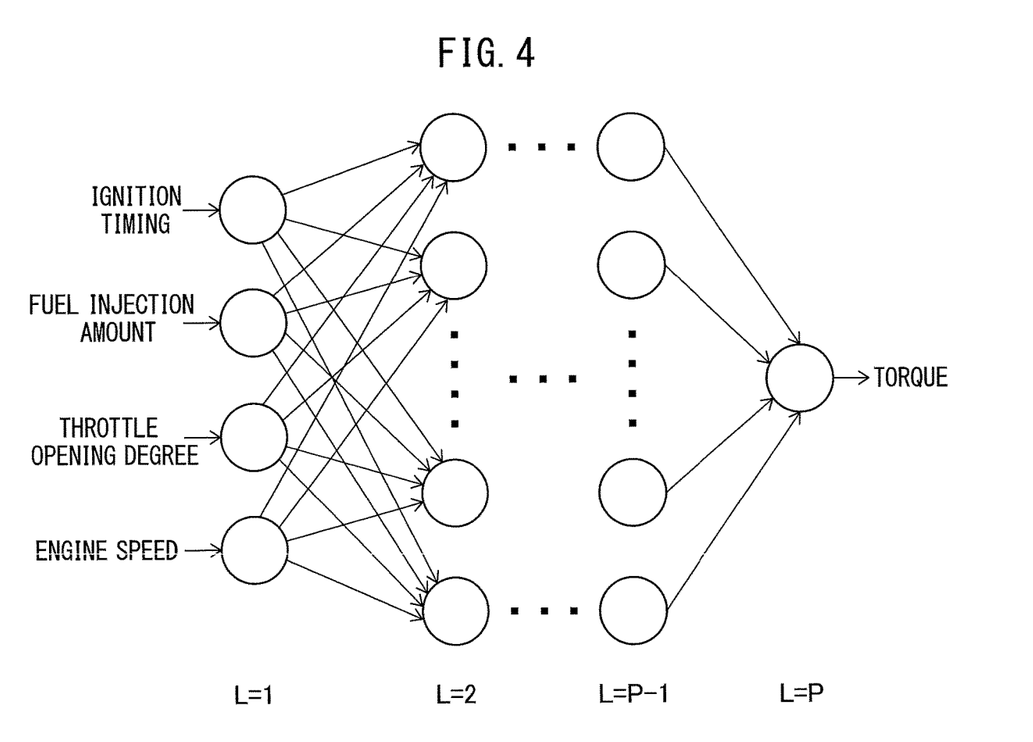
FIG. 4 is a view showing a specific example of a neural network in a learning model according to the first embodiment.

FIG. 4 shows a specific example of a neural network in the learning model according to the present embodiment. The neural network in the learning model shown in FIG. 4 has the ignition timing, fuel injection amount, throttle opening degree, and engine speed as input parameters and the torque as the output parameter. In the present embodiment, the neural network of the learning model is comprised of P layers (P is any whole number of 3 or more). The numbers of nodes at the hidden layers may be made any numbers. Further, in the neural network in the learning model shown in FIG. 4, the input layer (L=1) has four nodes corresponding to four input parameters, but it may also have any number of nodes other than four corresponding to the number of input parameters.

Summary of Control Using Learning Model and Learning

At the time of operation of the internal combustion engine, the actually measured values of the input parameters, that is, the actually measured values of the ignition timing, fuel injection amount, throttle opening degree, and engine speed are input to the parameter output part 221. When receiving the actually measured values of these input parameters as input, by using the learning model shown in FIG. 4, the parameter output part 221 outputs the predicted value of the output parameter, that is, the predicted value of the torque. Here, the predicted value of the torque is a future value and is a value different from the current torque when the predicted value of the torque is output (that is, torque detected by the torque sensor 51).

The engine control part 222 controls the internal combustion engine 100 based on the predicted value of the output torque which is output from the parameter output part 221 in this way. Specifically, for example, if the predicted value of the torque which is output from the parameter output part 221 had been a value different from the target torque set based on the engine load etc., the target values of the control parameters of the internal combustion engine 100 (for example, throttle opening degree, fuel injection amount, ignition timing, etc.) are changed so that the predicted value of the torque becomes the target value.

On the other hand, the learning of the learning model is performed at the learning part 223. The learning part 223 learns the learning model as explained above by using the gradient method and by using the combinations of actually measured values of the input parameters of the learning model and the actually measured value of the output parameter of the learning model as teacher data. The actually measured values of the input parameters are acquired in the same way as when input to the parameter output part 221. Further, when using a torque as the output parameter, the actually measured value is acquired from the output value of the torque sensor 51.

Problems in Gradient Descent Method when Noise is Superposed on Teacher Data

In this regard, when using as the learning model a standard model learned by a manufacturer etc. for a typical vehicle before shipment, features inherent to the individual vehicles are not reflected in the learning model. Therefore, if using such a learning model to estimate the value of an output parameter, error may occur between the predicted value of the output parameter output from such a learning model and the actual value of the output parameter.

Therefore, in order to reflect the features inherent to a vehicle in the weights "w" in the learning model to improve the prediction precision, it may be considered to use the teacher data inherent to the vehicle acquired during operation of the vehicle and learn the weights "w" by the gradient descent method. However, in this case, noise is superposed on the actually measured values of the input parameters and the actually measured value of the output parameter in this teacher data due to, for example, the driving environment, driving conditions, and other various factors. The error function E, as mentioned above, is calculated using the teacher data, and therefore when noise is superposed on the teacher data, the error function E is affected by the noise.

Figure 5:
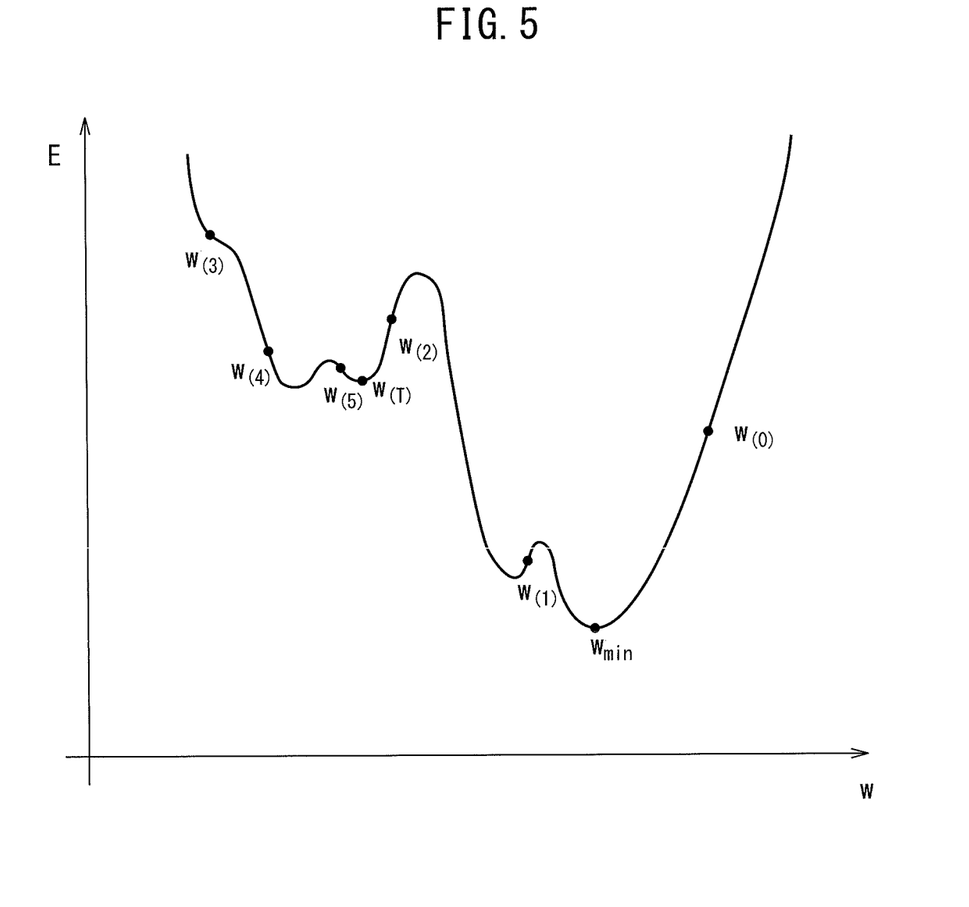
FIG. 5 is a view showing one example of the relationship between any one weight and an error function E(w) in the case where noise is superposed on teacher data.

FIG. 5 is a view showing one example of the relationship between any one weight and the error function E(w) in the case where noise is superposed on the teacher data. The relationship between the weight and E(w) shown in FIG. 5 shows the relationship in the case where noise is superposed on the teacher data when having the relationship such as shown in FIG. 3. In the example shown in FIG. 5, the relationship between the weight and the error function E(w) is affected by the noise superposed on the teacher data. As a result, the relationship has a wavy shape compared with the relationship shown in FIG. 3.

As shown in FIG. 5, at the first updating, the gradient $\partial E(w_{(0)})/w_{(0)}$ is positive, and therefore the weight is updated based on the equation (1) in the negative direction from $w_{(0)}$ to $w_{(1)}$. As shown in FIG. 5, at the second updating, the gradient $\partial E(w_{(1)})/w_{(1)}$ is positive, and therefore the weight is updated based on equation (1) in the negative direction from $w_{(1)}$ to $w_{(2)}$. After that, based on equation (1), the weight is similarly repeatedly updated from $w_{(2)}$ to $w_{(3)}$, $w_{(3)}$ to $w_{(4)}$, and $w_{(4)}$ to $w_{(5)}$. In this case, as will be understood from FIG. 5, the weight "w" does not converge to the weight $w_{min}$ when E(w) takes its smallest value. At the T-th updating, the weight $w_{(T)}$ converges to a value far from the weight $w_{min}$ when E(w) takes its smallest value.

If noise is superposed on the teacher data in this way, the weight "w" is less likely to converge to the weight $w_{min}$ when E(w) takes its smallest value. As a result, in some cases, as shown in FIG. 5, the value of the error function $E(w_{(T)})$ at the weight $w_{(T)}$ obtained by this learning becomes larger than the value of the error function $E(w_{(0)})$ at the initial value $w_{(0)}$ of the weight. For this reason, if using the weight $w_{(T)}$ obtained in this way, there is the possibility of the prediction error at the learning model becoming larger. In particular, if large noise is superposed on the teacher data, the effect of that noise easily appears in the error function E(w), and therefore the possibility of the convergence of the learning deteriorating and the possibility of the prediction error increasing become higher in this way.

On the other hand, when as the teacher data, a batch or minibatch is used, if increasing the batch size of the teacher data, the data is averaged, and thus the effect of the noise in learning of the learning model becomes smaller. For this reason, deterioration of convergence of learning and increase of the prediction error of the learning model are suppressed. However, along with the increase of the batch size, an increase in the size of the memory becomes necessary, and therefore there is the problem that the manufacturing cost of the vehicle increases.

Adjustment of Learning Rate

Therefore, in the present embodiment, the learning rate adjusting part 225 adjusts the learning rate η so that learning is performed by a smaller learning rate when the amount of noise superposed on the actually measured value of at least one parameter among the input parameters and output parameter of the learning model is relatively large compared to when the amount of noise superposed on the actually measured value of the parameter is relatively small. Due to this, it is possible to reduce the amount of updating of the weights "w" in the learning when noise is superposed on the teacher data, and therefore it becomes possible to keep down the deterioration of the convergence of the learning. For this reason, it becomes possible to keep down the increase of prediction error in the learned learning model. In this way, according to the present embodiment, even if noise is superposed on the teacher data, it is possible to keep down the effect of that noise in learning of the learning model. Below, the present embodiment will be explained in detail.

Learning Method According to Present Embodiment

Figure 6:
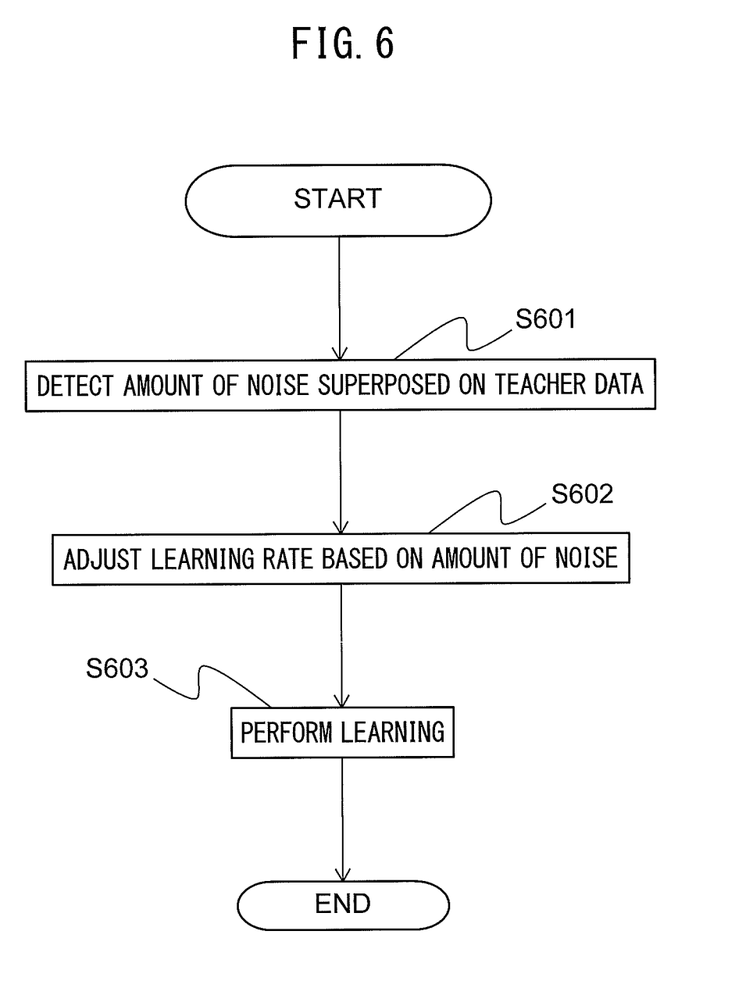
FIG. 6 is a flow chart for explaining a control routine of learning processing of a learning model according to the first embodiment.

Next, a learning method of a learning model used by a control device of an internal combustion engine according to the present embodiment will be explained. FIG. 6 is a flow chart for explaining the control routine of the learning method of the learning model in the control device of an internal combustion engine according to the first embodiment. The flow of the present control routine is realized by the processor of the control part 220 performing a program stored in the storage part 210. The present control routine is performed at a predetermined timing after a series of teacher data (data sets of teacher data) required for learning the weights and biases in the neural network during operation of the internal combustion engine is acquired.

At step S601, the noise detecting part 224 detects the amounts of noise superposed on the actually measured values of the input parameters and the actually measured value of the output parameter in the teacher data used in the learning part 223. The noise detecting part 224 may detect the amounts of noise superposed on the actually measured values for all of the input parameters and output parameter or may also be configured to detect the amounts of noise superposed on the actually measured values for part of the parameters. In this Description, the "amounts of noise" show the amounts relating to the errors of actually measured values output from sensors mounted in the vehicle from the true values for all parameters. In particular, the amounts of noise become larger the more the actually measured values of the sensors deviate from the true values.

For example, consider the example of using the engine speed as a parameter. If the vehicle greatly shakes while the vehicle is driving over a bad road, the position where the crank angle sensor 54 is mounted will change and as a result the distance between the crank angle sensor 54 and the crankshaft will change. The actually measured value of the crank angle output from the crank angle sensor 54 when the distance changes in this way deviates from the actually measured value (true value) of the crank angle when the position of the crank angle sensor 54 does not change. As a result, the actually measured value of the engine speed calculated based on the output of the crank angle sensor 54 becomes a value with error from the true value. The state where error occurs between the two in this way means the state in which the amount of noise becomes greater.

Specifically, it is possible to use various known indicators as the "amounts of noise". For example, it is possible to use the standard deviations of large numbers of actually measured values of parameters detected when the engine operating state is in the steady state as the amounts of noise for the parameters. Further, it is possible to calculate the reciprocals of the SN ratios for the parameters based on the actually measured values of the parameters detected when the engine operating state is the steady state and use the reciprocals of the SN ratios of the parameters as the amounts of noise for the parameters.

Below, the case of using the reciprocals of the SN ratios as the amounts of noise will be explained as an example. Note that, an SN ratio, for example, is calculated based on the average value and standard deviation of a large number of actually measured values of a parameter. After the noise detecting part 224 detects the amount of noise at step S601, the control routine proceeds to step S602.

At step S602, the learning rate adjusting part 225 adjusts the learning rate η when learning is performed at the learning part 223. The learning rate η is adjusted so that learning is performed by a smaller learning rate when the amount of noise superposed on the actually measured value of at least one parameter among the amounts of noise detected by the noise detecting part 224 is relatively large compared with when the amount of noise superposed on the actually measured values of that parameter is relatively small.

The learning rate adjusting part 225, for example, adjusts the learning rate so that the learning rate becomes smaller the larger the amount of noise superposed on the actually measured value of at least one parameter among the amounts of noise detected by the noise detecting part 224. As explained above, if the reciprocal of the SN ratio is used as an amount of noise, the learning rate adjusting part 225 adjusts the learning rate η so that the learning rate becomes smaller the smaller the SN ratios of the engine speed and torque detected by the noise detecting part 224. Specifically, in the present embodiment, the learning rate adjusting part 225 can use the following equation (9) to adjust the learning rate η.

[Equation 9]

$$\eta_B = \eta_A \prod_{j=1}^{J} r_j (SN_{j,B}) / (SN_{j,A}) \quad (9)$$

Here, $\eta_A$ is a reference value of the learning rate. $\eta_B$ is a learning rate after adjustment by the learning rate adjusting part 225. J is the total number of parameters used for adjustment of the learning rate in the input parameters and output parameter in the learning model. In the above equation (9), for example, J number of parameters with relatively large effects on the predicted value of the output parameter in the parameters are suitably used. $SN_{j,A}$ is a reference value of the SN ratio preset for the j-th parameter in the J number of parameters used in the above equation (9). $SN_{j,B}$ is the SN ratio of the actually measured value of the j-th parameter. $r_j$ is the preset reflection rate showing the extent by which the magnitude of the amount of noise is reflected in the learning rate for the j-th parameter.

The reference value $SN_{j,A}$ of the SN ratio may be a constant value or may be set in advance for each engine operating state. If set in advance for each engine operating state, the storage part 210 stores a correlation map of the engine operating states and the reference value $SN_{j,A}$ of the SN ratio. The learning rate adjusting part 225 acquires the current engine operating state (for example, the idling state etc.) and uses the correlation map to calculate the reference value $SN_{j,A}$ of the SN ratio based on the acquired engine operating state. The reflection rate $r_j$ is, for example, set to a relatively small value for a parameter with a relatively large effect on the predicted value of the output parameter or is otherwise set considering the effect of the parameter on the predicted value of the output parameter.

After the learning rate η is adjusted by the learning rate adjusting part 225 at step S602, the control routine proceeds to step S603.

At step S603, the learning part 223 uses the learning rate η adjusted by the learning rate adjusting part 225 to learn the learning model by the above-mentioned gradient descent method using a combination of the actually measured values of the input parameters and the actually measured value of the output parameter as teacher data. Specifically, the learning part 223 updates the weights of the neural network. After that, if a predetermined condition for ending the learning stands, the learning part 223 ends the learning of the learning model. Here, as the predetermined condition for ending the learning, for example, the amounts of change of the weights "w" before and after the final updating of the weights being equal to or less than predetermined values, the number of times of updating the weights "w" reaching a predetermined number of times, etc., may be mentioned.

Due to the above, the present control routine is ended.

Explanation of Modification of Learning Results

Figure 7A:
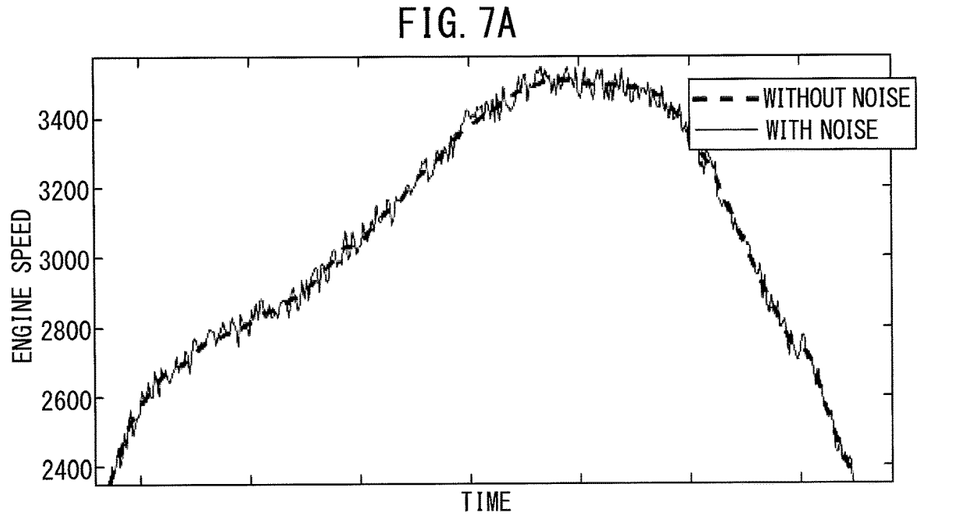
FIGS. 7A to 7C are views for explaining a modification of the learning results according to the presence or absence of noise superposition and adjustment of the learning rate.

Using FIGS. 7A to 7C, an example of a change of the learning results by the presence of any superposition of noise and adjustment of the learning rate will be explained. FIG. 7A is a time chart illustrating the speed of the internal combustion engine of the vehicle. FIG. 7A shows the engine speed in the case where noise is superposed (with noise) and engine speed in the case where noise is not superposed (without noise). The histograms shown in FIG. 7B and FIG. 7C explained below show the distributions of prediction error in the case where the engine speed trends such as shown in FIG. 7A.

Figure 7B:
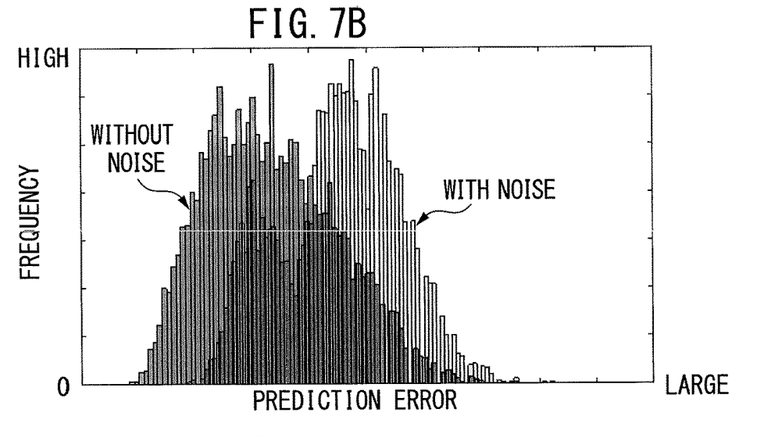
Figure 7C:
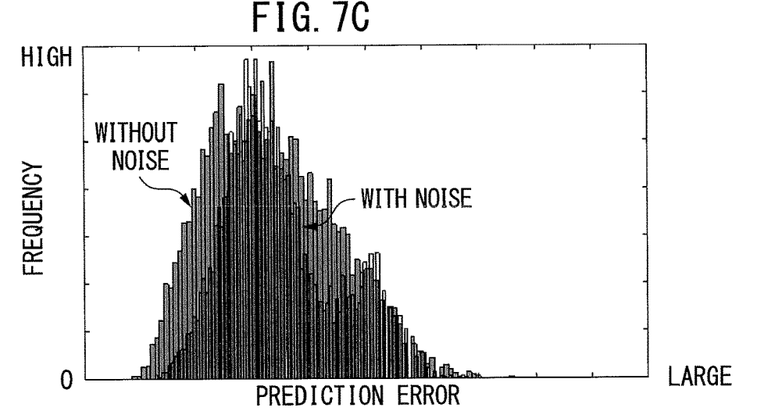

FIG. 7B and FIG. 7C are histograms showing the distributions of prediction error in the learning model. FIG. 7B and FIG. 7C show a histogram (with noise) in the case of using teacher data including an engine speed with noise shown in FIG. 7A as an input parameter and a histogram (without noise) in the case of using teacher data including an engine speed without noise shown in FIG. 7A as an input parameter. When preparing the histograms of FIG. 7B and FIG. 7C, as the input parameters and output parameter shown in FIG. 4, that is, as the input parameters, the ignition timing, fuel injection amount, throttle opening degree, and engine speed were used and as the output parameter, the torque was used. Further, in FIG. 7B and FIG. 7C, the histograms are prepared by learning the weights several times using the gradient descent method and calculating the prediction error of the output parameter of the torque each time the learning ends. Note that, the darkest colored parts in the histogram of FIG. 7B show the overlapping parts of the histogram with noise and histogram without noise.

FIG. 7B shows a histogram in the case where the learning rate η is set to 0.1. As shown in FIG. 7B, the center values of the histogram with noise are distributed more to the side with larger prediction error than the center values of the histogram with no noise. Therefore, if the learning rate $\eta$ is set to 0.1, the learning model learned using the teacher data on which noise is superposed is poorer in prediction precision than the learning model learned using teacher data on which noise is not superposed.

On the other hand, FIG. 7C shows a histogram in the case where the learning rate $\eta$ is set to 0.08. The center values of the histogram shown in FIG. 7C with noise are distributed at positions substantially the same as the center values of the histogram with no noise. Further, the center values of the histogram with noise shown in FIG. 7C are distributed more to the side with smaller prediction error than the center values of the histogram with noise shown in FIG. 7B. Due to the above, it is understood that when the amount of noise is large, by making the learning rate $\eta$ smaller, deterioration of the prediction error is suppressed. Accordingly, it is understood that the effect of noise superposed on teacher data on the learning results is suppressed.

In this way, according to the present embodiment, even if noise is superposed on the teacher data, it is possible to keep down the effect of the noise on the learning of the learning model.

Modification

Figure 8:
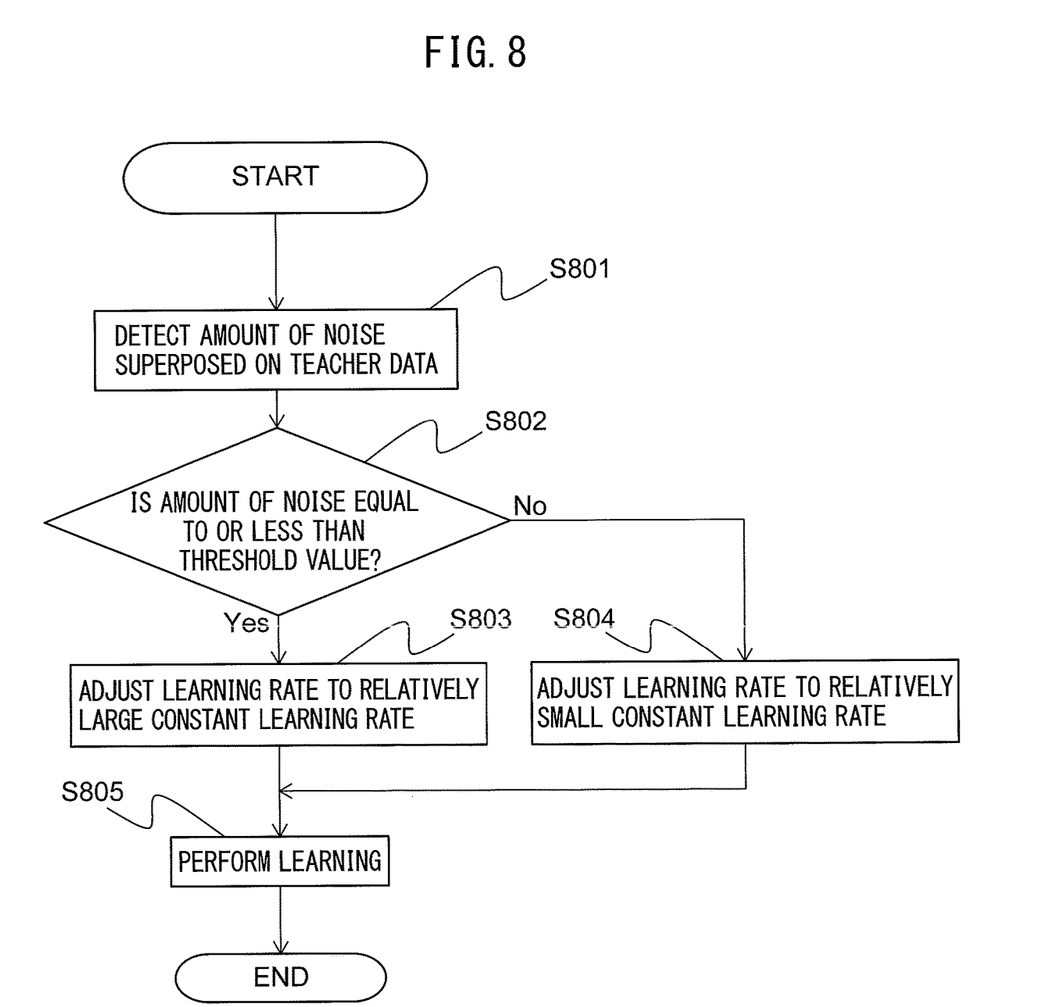
FIG. 8 is a flow chart for explaining a control routine of learning processing of a learning model according to a modification.

Next, using FIG. 8, a control device of an internal combustion engine according to a modification of the first embodiment will be explained. FIG. 8 is a flow chart for explaining the control routine of the learning method of a learning model in the control device of the internal combustion engine according to the present modification. The flow of the present control routine is realized by the processor of the control part 220 running a program stored in the storage part 210. Note that, steps S801 and S805 respectively are similar to steps S601 and S603 of FIG. 6, and therefore explanations will be omitted.

At step S802, the learning rate adjusting part 225 determines if an amount of noise detected by the noise detecting part 224 is equal to or less than a threshold value set for the parameter. This threshold value may be a preset constant value or may be set in advance for each engine operating state. If set in advance for each engine operating state, the storage part 210 stores a correlation map of the engine operating states and threshold value. The learning rate adjusting part 225 acquires the current engine operating state and uses the correlation map to calculate the threshold value based on the acquired engine operating state.

If at step S802 it is determined that each of the amounts of noise is the threshold value or less, the control routine proceeds to step S803. At step S803, the learning rate adjusting part 225 adjusts the learning rate $\eta$ so as to be maintained at a constant learning rate $\eta_H$ larger than the learning rate $\eta_L$ in the case where at least one of the amounts of noise is larger than the threshold value.

If at step S802 it is determined that the amount of noise superposed on the actually measured value of at least one parameter in the amount of noise is larger than the threshold value, the control routine proceeds to step S804. At step S804, the learning rate adjusting part 225 adjusts the learning rate $\eta$ so as to be maintained at a certain learning rate $\eta_L$ smaller than the learning rate $\eta_H$ in the case where the amount of noise is equal to or less than the threshold value.

Note that, in the present modification, at step S804, the learning rate adjusting part 225 adjusted the learning rate to maintain it at a certain value, but the invention is not limited to this. The learning rate adjusting part 225 may also change the learning rate in accordance with the amount of noise. In this case, the learning rate adjusting part 225, for example, uses only parameters with amounts of noise greater than the above threshold value to adjust the learning rate $\eta$ based on the above equation (9).

Whatever the case, in the present modification, the learning rate is set smaller when the amount of noise superposed on at least one parameter among the input parameters and output parameter is greater than a predetermined threshold value compared to when the amount of noise superposed on the parameter is smaller than this threshold value.

Further, in the present modification, the amount of noise is detected at step S801. However, the state where the amount of noise is large or the state where the amount of noise is small can be estimated without finding the amount of noise as explained above. For example, as explained above, when the vehicle is driving on a bad road, the amount of noise superposed on the actually measured value of the engine speed becomes larger, while when the vehicle is driving on a paved road, the amount of noise superposed on the actually measured value of the engine speed becomes smaller. Therefore, it is possible to determine if a large noise is superposed on the actually measured value of the engine speed based on whether the vehicle is driving on a bad road.

Therefore, in this case, the learning rate may be set smaller when the amount of noise is large (for example, when driving on a bad road is detected) compared with the state when the amount of noise is small (for example, when driving on a paved road is detected).

Summarizing the above, in the present embodiment and modification, the learning rate is adjusted so that the learning rate becomes smaller when the amount of noise superposed on the actually measured value of at least one parameter among the input parameters and output parameter is relatively large compared to when the amount of noise superposed on the actually measured value of the parameter is relatively small.

Second Embodiment

Figure 9:
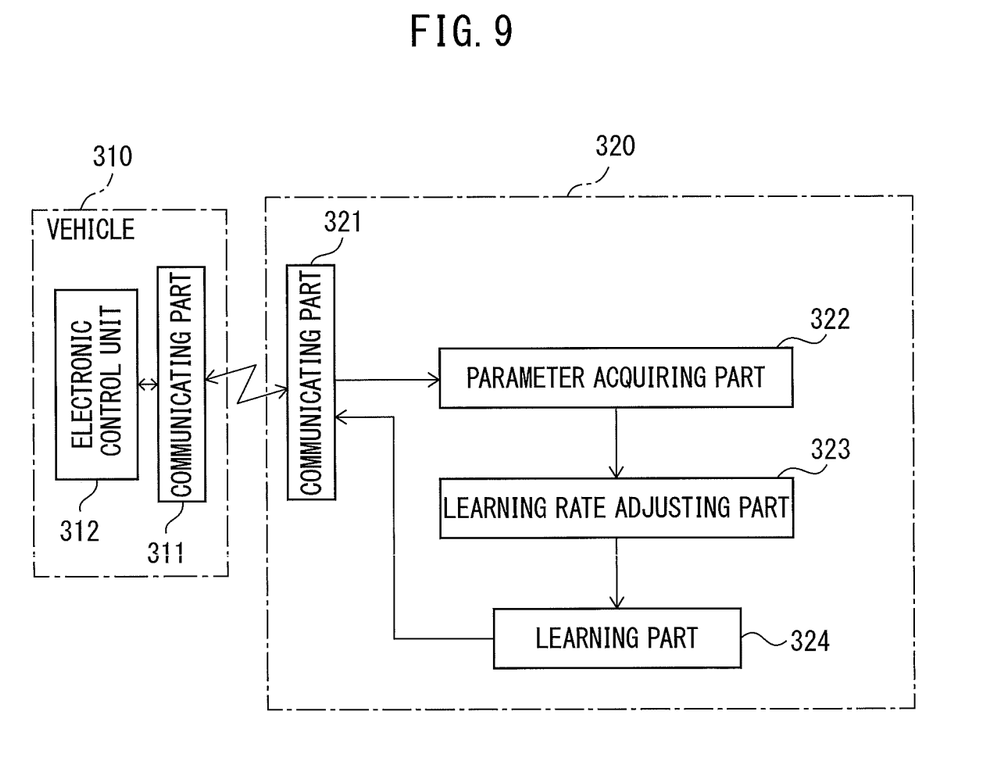
FIG. 9 is a schematic view of the configuration of a control device of an internal combustion engine according to a second embodiment.

FIG. 9 is a schematic view of the configuration of a control device of an internal combustion engine according to a second embodiment. FIG. 9 shows a vehicle 310 and a server 320 arranged outside of the vehicle 310. As shown in FIG. 9, the vehicle 310 includes a communicating part 311 and an ECU 312. The ECU 312 is configured in the same way as the ECU 200 according to the first embodiment except for the point of not including the learning part 223 and learning rate adjusting part 225. In the present embodiment, the ECU 200 and server 320 of the vehicle 310 function as the control device of the internal combustion engine 100. Below, parts different from the constitution of the control device of the internal combustion engine according to the first embodiment will be focused on in the explanation.

In the present embodiment, the ECU 312 of the vehicle 310 acquires a combination of actually measured values of the input parameters of the learning model and an actually measured value of the output parameter of the learning model as teacher data. The noise detecting part 224 of the ECU 312 detects the amounts of noise superposed on the actually measured values of the input parameters and the actually measured value of the output parameter in the teacher data acquired by the ECU 312. The ECU 312 of the vehicle 310 sends the teacher data and the amounts of noise through the communicating part 311 to the server 320.

Further, as shown in FIG. 9, the server 320 includes a communicating part 321, parameter acquiring part 322, learning rate adjusting part 323, and learning part 324. The communicating part 321 of the server 320 is configured to be able to communicate with the communicating part 311 of the vehicle 310.

The parameter acquiring part 322 of the server 320 receives the teacher data and the amounts of noise sent from the communicating part 311 of the vehicle 310 through the communicating part 321. The learning rate adjusting part 323 of the server 320 adjusts the learning rate η so that learning by the learning part 324 is performed by a smaller learning rate when the amount of noise superposed on the actually measured value of at least one parameter among the amounts of noise detected at the noise detecting part 224 compared to when the amount of noise superposed on the actually measured value of the parameter is relatively small. The learning part 324 uses the learning rate adjusted based on the teacher data by the learning rate adjusting part 323 to learn the weights of the neural network in the learning model by the gradient descent method. Next, the learning part 324 sends the learning model after learning through the communicating part 321 to the vehicle 310.

The ECU 312 of the vehicle 310 receives the learning model after learning sent through the communicating part 311 from the server 320. The ECU 312 of the vehicle 310 rewrites the learning model stored in the storage part 210 of the ECU 312 by the received learning model after learning so as to update the weights of the neural network of the learning model. The parameter output part 221 of the ECU 312 of the vehicle 310 uses the updated learning model to output the predicted value of the output parameter if the actually measured values of the input parameters are input. The engine control part 222 of the ECU 312 of the vehicle 310 controls the internal combustion engine 100 based on the predicted value of the output parameter output from the updated learning model.

Note that, in the present embodiment, the noise detecting part 224 is provided at the ECU 312, but the invention is not limited to this. This may also be provided at the server 320. In this case, the noise detecting part 224 of the server 320 can detect the amounts of noise superposed on the actually measured values of the input parameters and output parameter based on the teacher data sent from the ECU 312 of the vehicle 310.

According to the present embodiment, at the server 320, the weights and biases of the neural network of the learning model are learned. For this reason, the ECU 312 of the vehicle 310 no longer has to be provided with a high performance processing device for learning the weights of the neural network in the learning model. As a result, it is possible to reduce the manufacturing costs of the vehicle.

Note that, in the above embodiment, as the gradient method, the gradient descent method was used, but the invention is not limited to this. The gradient ascent method may also be used for learning of the learning model so as to find the maximum value of the function E'=−E reflecting the sign of the error function E. Further, in the above embodiment, the explanation was given with reference to the example of use of a neural network as a learning model, but so long as the gradient method is used, another machine learning model may also be used. Still further, the method of acquisition of the actually measured values of the above-mentioned parameters is just one example. The actually measured values of the parameters may also be acquired by other methods.

REFERENCE SIGNS LIST 1. engine body
10a. throttle opening degree sensor
18a. EGR valve opening degree sensor
24. intake temperature sensor
25. exhaust temperature sensor
26. water temperature sensor
27. oil temperature sensor
28. gas concentration sensor
29. air-fuel ratio sensor
100. internal combustion engine

The invention claimed is:

1. A control device of an internal combustion engine for controlling an operation of an internal combustion engine of a vehicle, the control device of an internal combustion engine being configured to:
output a predicted value of an output parameter by using a learning model if actually measured values of input parameters are input,
control the internal combustion engine based on the predicted value of the output parameter output from the parameter output part,
learn the learning model by using a gradient method and by using a combination of actually measured values of the input parameters of the learning model and an actually measured value of the output parameter of the learning model as teacher data, and
adjust a learning rate so that the learning is performed by a smaller learning rate when an amount of noise superposed on an actually measured value of at least one parameter among the input parameters and the output parameter is relatively large compared with when the amount of noise superposed on the actually measured value of the parameter is relatively small.

2. The control device of an internal combustion engine according to claim 1, the control device of an internal combustion engine is configured to detect the amounts of noise superposed on the actually measured values of the input parameters and the actually measured value of the output parameter, and the control device of an internal combustion engine is configured to calculate a standard deviation or a reciprocal of an SN ratio of each parameter based on the actually measured values of the input parameters and output parameter detected when the engine operating state is a steady state and using the standard deviation or the reciprocal of the SN ratio of each parameter as the amount of noise of the parameter.

3. The control device of an internal combustion engine according to claim 1, wherein the control device of an internal combustion engine is configured to adjust the learning rate so that the learning rate becomes smaller the larger the amount of noise superposed on the actually measured value of at least one parameter.

4. The control device of an internal combustion engine according to claim 1, wherein when the amounts of noise superposed on the actually measured values of the input parameters and the output parameter are equal to or less than threshold values set for the parameters, the control device of an internal combustion engine is configured to adjust the learning rate so as to be maintained at a constant learning rate larger than the learning rate when the amount of noise superposed on the actually measured value of at least one parameter is larger than the threshold value.

5. The control device of an internal combustion engine according to claim 1, wherein the control device of an internal combustion engine is an electronic control unit provided at the vehicle.

6. The control device of an internal combustion engine according to claim 1, wherein the control device of an internal combustion engine comprises an electronic control unit provided at the vehicle and a server installed at an outside of the vehicle and configured to be able to communicate with the electronic control unit, the electronic control unit is configured to send the teacher data to the server, the server is configured to adjust a learning rate based on the amount of noise superposed on the actually measured values of the input parameters and the actually measured value of the output parameter included in the teacher data, the server is configured to learn the learning model by using the teacher data received from the electronic control unit and sends the learning model after learning to the electronic control unit, and the electronic control unit is configured to use the learning model after learning sent from the server to the electronic control unit.

7. A control method of an internal combustion engine using a learning model to control an operation of the internal combustion engine of a vehicle, the control method of an internal combustion engine cause a processor to perform steps of:

adjusting a learning rate so as to become smaller when the amount of noise superposed on the actually measured value of at least one parameter among the input parameters of the learning model and the output parameter of the learning model is relatively large compared with when the amount of noise superposed on the actually measured value of the parameter is relatively small, learning of the learning model by a gradient method by using the adjusted learning rate and by using a combination of the actually measured values of the input parameters and the actually measured value of the output parameter as teacher data, outputting a predicted value of the output parameter by using the learning model if the actually measured values of the input parameters are input, and controlling the internal combustion engine based on the output predicted value of the output parameter.

8. A learning model for controlling an internal combustion engine, the leaning model causes a processor to function so as to output a predicted value of an output parameter used for control of an internal combustion engine if actually measured values of input parameters are input, wherein the learning model is learned by a gradient method using a combination of actually measured values of the input parameters and an actually measured value of the output parameter as teacher data, and, in the learning, a learning rate adjusted to become a smaller learning rate is used when the amount of noise superposed on the actually measured value of at least one parameter among the input parameters and the output parameter is relatively large compared with when the amount of noise superposed on the actually measured value of that parameter is relatively small.

9. A learning method of a learning model for controlling an internal combustion engine, the learning method causes a processor to function so as to output a predicted value of an output parameter used for control of an internal combustion engine if actually measured values of input parameters are input, wherein the learning model is learned by a gradient method using a combination of actually measured values of the input parameters and an actually measured value of the output parameter as teacher data, and, in the learning, a learning rate adjusted to become a smaller learning rate is used when the amount of noise superposed on the actually measured value of at least one parameter among the input parameters and the output parameter is relatively large compared with when the amount of noise superposed on the actually measured value of that parameter is relatively small.

* * * * *